(12) United States Patent
Cuadrat et al.

(10) Patent No.: US 9,986,088 B2
(45) Date of Patent: May 29, 2018

(54) AUTOMATED MDN LINE TRANSFER

(71) Applicant: Verizon Patent and Licensing Inc., Arlington, VA (US)

(72) Inventors: Ruben Cuadrat, New York, NY (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 62 days.

(21) Appl. No.: 14/959,649

(22) Filed: Dec. 4, 2015

(65) Prior Publication Data
US 2017/0163802 A1 Jun. 8, 2017

(51) Int. Cl.
*H04M 3/00* (2006.01)
*H04M 3/42* (2006.01)

(52) U.S. Cl.
CPC .............................. *H04M 3/42272* (2013.01)

(58) Field of Classification Search
CPC ................................................ H04M 3/42272
USPC ............ 455/418, 550.1, 414.1, 432.1, 435.2, 455/552.1
See application file for complete search history.

(56) References Cited

U.S. PATENT DOCUMENTS

2014/0073300 A1* 3/2014 Leeder ................. H04B 5/0031
455/416
2015/0023488 A1* 1/2015 Lee ......................... H04M 3/54
379/211.02

* cited by examiner

*Primary Examiner* — Chuck Huynh

(57) ABSTRACT

A computer device may include logic configured to detect a mobile directory number (MDN) subscriber line transfer triggering event; identify a first user device associated with the MDN subscriber line, wherein the first user device corresponds to a connected device with respect to the MDN subscriber line; and identify a second user device associated with the MDN subscriber line, wherein the second user device corresponds to a non-connected device with respect to the MDN subscriber line. The logic may be further configured to determine that the MDN subscriber line is to be transferred from the first user device to the second user device based on the detected MDN subscriber line transfer triggering event and transfer the MDN subscriber line from the first user device to the second user device, in response to determining that the MDN subscriber line is to be transferred.

20 Claims, 11 Drawing Sheets

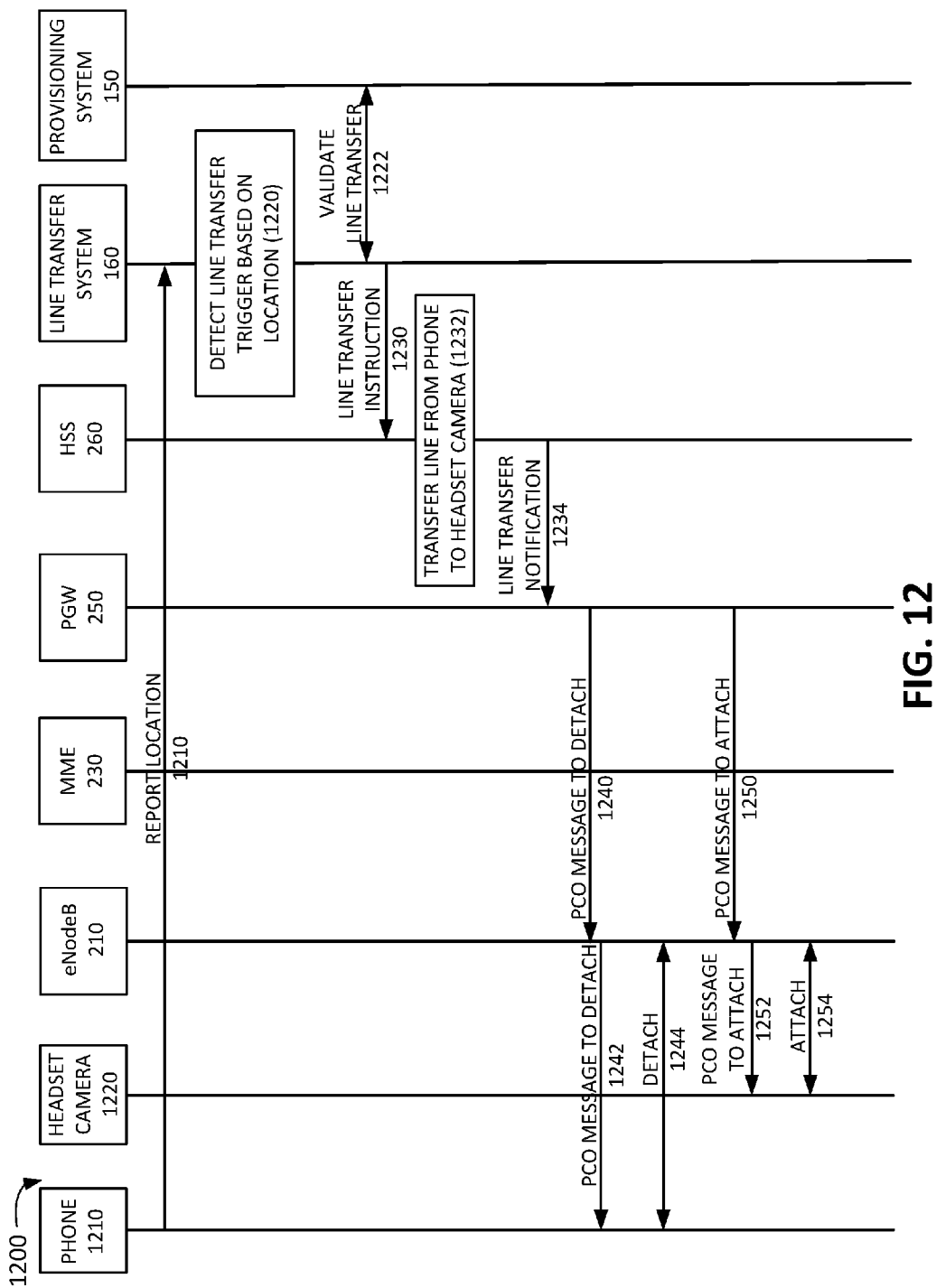

US 9,986,088 B2

AUTOMATED MDN LINE TRANSFER

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A user may have a subscription with a provider of wireless communication services and the subscription may be associated with a telephone number. The user may use multiple devices in connection with the subscription.

BRIEF DESCRIPTION OF THE DRAWINGS

FIG. 12 is an exemplary diagram of a second signal flow according to an implementation described herein.

DETAILED DESCRIPTION OF PREFERRED EMBODIMENTS

Figure 1:
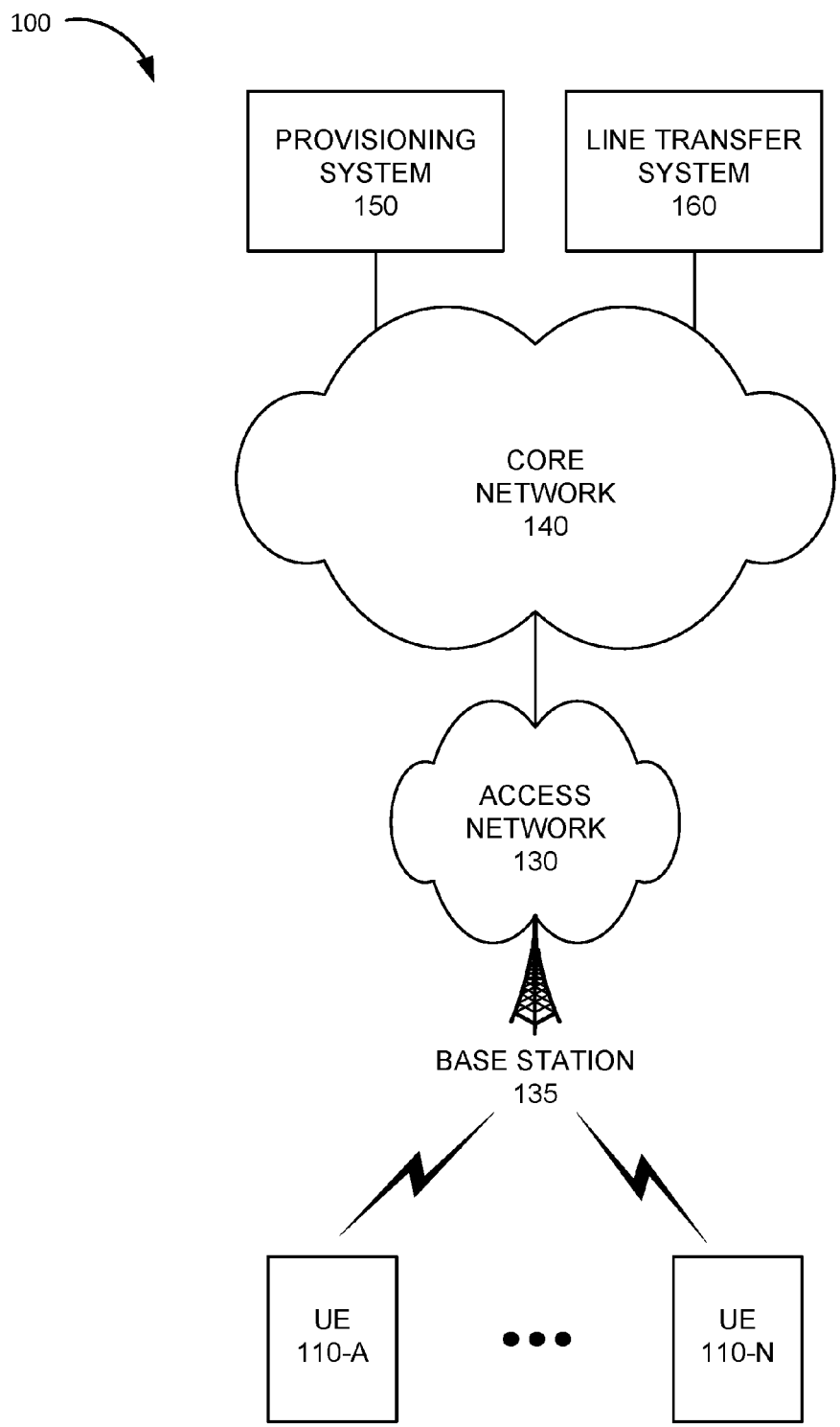
FIG. 1 is a diagram illustrating an environment according to an implementation described herein.

The following detailed description refers to the accompanying drawings. The same reference numbers in different drawings identify the same or similar elements.

A provider of wireless communication services may provide subscriptions that enable a subscriber to connect to a wireless access network using a limited number of devices. For example, a subscription may enable a subscriber to connect a single user device at a time. The user may place or receive voice telephone calls via a Mobile Directory Number (MDN) using a user device when the user device is connected using the subscription line. Additionally or alternatively, the user may send or receive data using the subscription line associated with the MDN. Thus, the subscription line may provide Internet Protocol (IP) connectivity for a user device to a network via a wireless access network.

A "subscription line," as the term is used herein, refers to a communication link from a user device to a core network via a wireless access network, authorized by a provider of communication services based on a subscription, wherein the connection includes the reservation of resources to enable the user device to communicate with the core network via wireless signals. The reservation of resources may include the establishment of IP connectivity between the user device and the core network and/or the establishment of default and/or dedicated bearers between the user device and the core network by the wireless access network.

The user may own multiple devices and may want to use multiple devices with the subscription line. For example, the user may own a smart phone, a tablet computer, and a headset camera enabled for wireless communication. The user may transfer the subscriber line from a first device to a second device by transferring a Subscriber Identity Module (SIM) card from the first device to the second device. The SIM card may be used to authenticate the user's subscription.

Transferring the SIM card from one device to another may be inconvenient and time consuming. In place of having to move the SIM card, the provider of communication services may provide a portal that enables the user to transfer the subscriber line from a first device to a second device. For example, the user may access a web site associated with the portal, may enter credentials (e.g., a username and password), may be authenticated using the entered credentials, and may select to transfer the line from the first device to the second device. However, accessing a portal may still be inconvenient and may require user action. The user may forget to transfer the subscriber line and may not be able to use the selected device.

Implementations described herein relate to an automated MDN subscriber line transfer. A line transfer system may be configured to detect an MDN subscriber line transfer triggering event, to identify a first user device connected to the MDN subscriber line, and to identify a second user device, associated with the MDN subscriber line, which is not connected to the MDN subscriber line. The line transfer system may determine that the MDN subscriber line should be transferred from the first user device to the second user device based on the detected MDN subscriber like transfer triggering event, and may transfer the MDN subscriber line from the first user device to the second user device, in response to determining that the MDN subscriber line should be transferred from the first user device to the second user device. The line transfer system may, before transferring the line, validate the transfer with a provisioning system to ensure that the subscription is authorized for the transfer.

The triggering event may be "learned" based on user behavior. For example, user devices associated with the subscription may, with the user's permission, send updates at particular intervals to the line transfer system. The line transfer system may receive a status update from a user device, may identify a context condition during which the user device is using the MDN subscriber line connection based on the received status update, and may use machine learning to recognize a line transfer triggering event based on the identified context condition.

Thus, detecting the line transfer triggering event may include detecting one or more conditions associated with the user's routine. For example, if the user goes for a jog around 8 AM each morning and switches the subscriber line from the user's phone to a computer watch enabled for Long Term Evolution (LTE) wireless communication, the line transfer system may learn to recognize the user's routine and may automatically transfer the subscriber line from the user's phone to the user's LTE watch at 8 AM provided that one or more additional conditions are satisfied. For example, the line transfer system may make sure that the LTE watch is in motion before transferring the subscriber line connection. Detected conditions associated with a user's routine may include a particular time of day, a particular day of week, a particular location, a detected proximity to a particular device, a particular type of user device, a particular type of calendar event, a particular type of scheduled broadcast, a particular type of received message, and/or another type of condition.

The triggering event may be based on detecting that the second user device is in a particular location. As an example, if the user has registered a headset camera (e.g., a GoPro® camera) with the subscription, the subscriber line may be transferred to the headset camera when the headset camera is detected to be outside a particular radius of the user's home. As another example, if the headset camera is detected to be in a location identified as a ski resort, the subscriber line may be transferred to the headset camera.

The triggering event may be based on detecting a proximity to another device. For example, if the user's LTE watch is connected to the network using the subscriber line and the user has a tablet computer in proximity (e.g., within a Bluetooth® transmission range of the LTE watch, etc.), and if the tablet computer is being used, the subscriber line may be transferred to the tablet computer.

The triggering event may be based on receiving a request to transfer the subscriber line from a first device to a second device. The request may be a "push" request, in which a first device connected to the subscriber line requests to transfer the subscriber to a second device not connected to the subscriber, or a "pull" request, in which the second device requests to transfer the subscriber line to itself. For example, an appliance device may need to communicate with a server and may request to pull the subscriber line from the user's phone to send a message to or request information from the server. After the appliance device finishes using the subscriber line, the appliance device may push the subscriber line back to the user's phone. As another example, a group of devices may use a subscriber line, or a pool of subscriber lines, to send data to a server. For example, a group of parking meters may share a pool of subscriber lines and a parking meter may request a subscriber line when a vehicle parks at the parking meter and may return the subscriber line to the pool when the vehicle drives away.

The line transfer system may transfer the subscriber line from a first device to a second device by instructing a wireless access system to transfer the line from the first device to the second device. For example, in an LTE access network, a Home Subscriber Server (HSS) may authenticate a device based on a SIM subscription when the device attempts to attach to the LTE network. The HSS may change the active device associated with the subscriber line from the first device and the second device and may send an indication of the change to another element in the LTE network, such as a Packet Data Network Gateway (PGW) or a Mobility Management Entity (MME). The other element may then instruct the first device to detach from the access network and may instruct the second device to attach to the network. In some implementations, the instruction may be sent in a Protocol Configuration Option (PCO) message. The PCO message may include a container field that stores information relating to which device is connected to the subscription line and/or whether a device should attach or detach from the access network based on the connection information.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 130, a core network 140, a provisioning system 150, and a line transfer system 160.

UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

In some implementations, UE device 110 may correspond to an embedded wireless device that communicates wirelessly with other devices over a machine-to-machine interface. For example, UE device 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, a parking meter, etc.), and/or another type of electronic device.

Access network 130 may provide access to core network 140 for wireless devices, such as UE device 110. Access network 130 may enable UE device 110 to provide mobile telephone service and/or data services to UE device 110. Access network 130 may include a base station 135 and UE device 110 may wirelessly communicate with access network 130 via base station 135. Access network 130 may establish a packet data network connection between UE device 110 and core network 140. For example, access network 130 may establish an Internet Protocol (IP) connection between UE device 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1).

Provisioning system 150 may include one or more devices, such as computer devices and/or server devices, which maintain provisioning information for UE devices 110. For example, when a customer orders and/or purchases a subscription, provisioning system 150 may provision the subscription with respect to access network 130. Furthermore, provisioning system 150 may assign telephone numbers to subscriptions (e.g., a MDN, an International Mobile Subscriber Identity (IMSI), a Mobile Station International Subscriber Directory Number (MSISDN), etc.), may store authentication keys for SIM cards associated with subscriptions, may maintain authentication, updates, and/or billing applications for SIM cards, and/or may maintain other types of information.

Line transfer system 160 may include one or more devices, such as computer devices and/or server devices, which manage line transfers for a subscription associated with UE devices 110. For example, line transfer system 160 may perform machine learning to learn conditions based on which a subscription line should be automatically transferred to a particular UE device 110. Line transfer system 160 may monitor for the learned conditions and may perform a subscription line transfer from a connected UE device 110 to a non-connected UE device 110. Furthermore, line transfer system 160 may process requests to transfer a subscription line from a first UE device 110 to a second UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
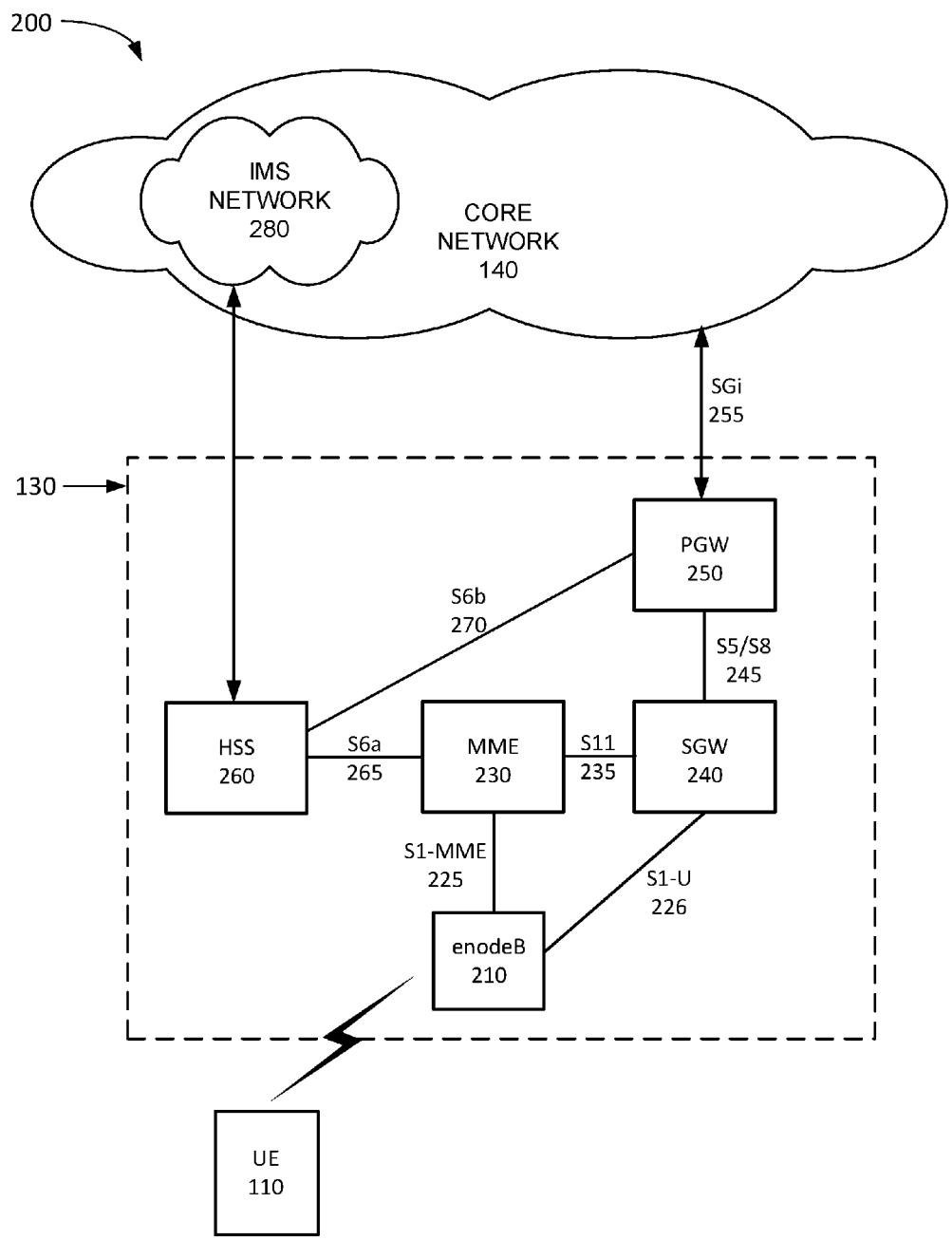
FIG. 2 is a diagram illustrating exemplary components of the access network of FIG. 1.

FIG. 2 is a diagram illustrating exemplary components of a system 200 that includes access network 130 according to an implementation described herein. As shown in FIG. 2, system 200 may include UE device 110, access network 130, and core network 140. Access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) 230, a serving gateway (SGW) 240, a packet data network gateway (PGW) 250, and a home subscriber server (HSS) 260. While FIG. 2 depicts a single eNodeB 210, MME 230, SGW 240, PGW 250, and HSS 260 for illustration purposes, in other implementations, FIG. 2 may include multiple eNodeBs 210, MMES 230, SGWs 240, PGWs 250, and/or HSSs 260.

eNodeB 210 may include one or more devices (e.g., base stations) and other components and functionality that allow UE device 110 to wirelessly connect to access network 130. eNodeB 210 may include or be associated with one or more cells. For example, each cell may include a radio frequency (RF) transceiver facing a particular direction. eNodeB 210 may interface with access network 130 via an interface referred to as an S1 interface, which may be split into a control plane S1-MME interface 225 and a data plane S1-U interface 226. S1-MME interface 225 may interface with MME 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME 230 may implement control plane processing for access network 130. For example, MME 230 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 230 may also select a particular SGW 240 for a particular UE device 110. A particular MME 230 may interface with other MMES 230 in access network 130 and may send and receive information associated with UE devices 110, which may allow one MME to take over control plane processing of UE devices serviced by another MME, if the other MME becomes unavailable.

SGW 240 may provide an access point to and from UE device 110, may handle forwarding of data packets for UE device 110, and may act as a local anchor point during handover procedures between eNodeBs 210. SGW 240 may interface with PGW 250 through an S5/S8 interface 245. S5/S8 interface 245 may be implemented, for example, using GTPv2.

PGW 250 may function as a gateway to core network 140 through an SGi interface 155. Core network 140 may include, for example, an IMS network, which may provide voice and multimedia services to UE device 110, based on Session Initiation Protocol (SIP). A particular UE device 110, while connected to a single SGW 240, may be connected to multiple PGWs 250, one for each packet network with which UE device 110 communicates.

MME 230 may communicate with SGW 240 through an S11 interface 235. S11 interface 235 may be implemented, for example, using GTPv2. S11 interface 235 may be used to create and manage a new session for a particular UE device 110. S11 interface 235 may be activated when MME 230 needs to communicate with SGW 240, such as when the particular UE device 110 attaches to access network 130, when bearers need to be added or modified for an existing session for the particular UE device 110, when a connection to a new PGW 250 needs to be created, or during a handover procedure (e.g., when the particular UE device 110 needs to switch to a different SGW 240).

HSS 260 may store information associated with UE devices 110 and/or information associated with users of UE devices 110. For example, HSS 260 may store subscription profiles that include authentication and access authorization information. Each subscription profile may include a list of UE devices 110 associated with the subscription as well as an indication of which UE device 110 is active (e. g., authorized to connect to access network 130 and to core network 140 via access network 130).

MME 230 may communicate with HSS 260 through an S6a interface 265. S6a interface 265 may be implemented, for example, using a Diameter protocol. PGW device 250 may communicate with HSS device 260 through an S6b interface 270. S6b interface 270 may be implemented, for example, using a Diameter protocol. Core network 140 may include IMS network 280. IMS network 280 may be associated with an IMS core identity for a particular subscription. HSS 260 may receive information identifying the IMS core identity for a subscription and may provide the IMS core identity to a particular UE device that is connected to access network 130.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
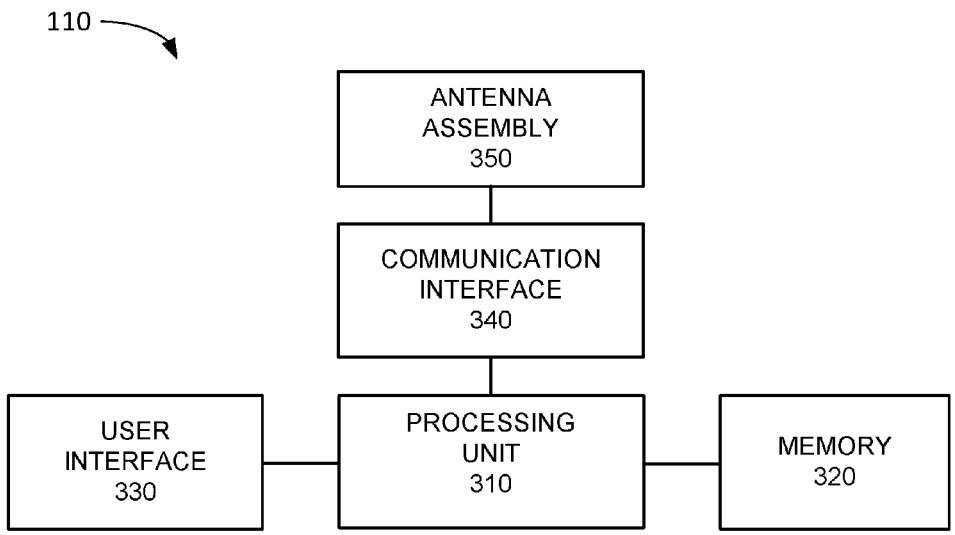
FIG. 3 is a diagram illustrating exemplary components of the user equipment (UE) of FIG. 1.

FIG. 3 is a diagram illustrating example components of UE device 110 according to an implementation described herein. As shown in FIG. 3, UE device 110 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of UE device 110 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to UE device 110 and/or to output information from UE device 110. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid-crystal display (LCD), to output visual information and receive commands; an actuator to cause UE device 110 to vibrate; and/or any other type of input or output device.

Communication interface 340 may include a transceiver that enables UE device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, UE device 110 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 3 shows example components of UE device 110, in other implementations, device 300 may include fewer components, different components, differently arranged components, or additional components than depicted in FIG. 3. Additionally or alternatively, one or more components of UE device 110 may perform the tasks described as being performed by one or more other components of UE device 110.

Figure 4:
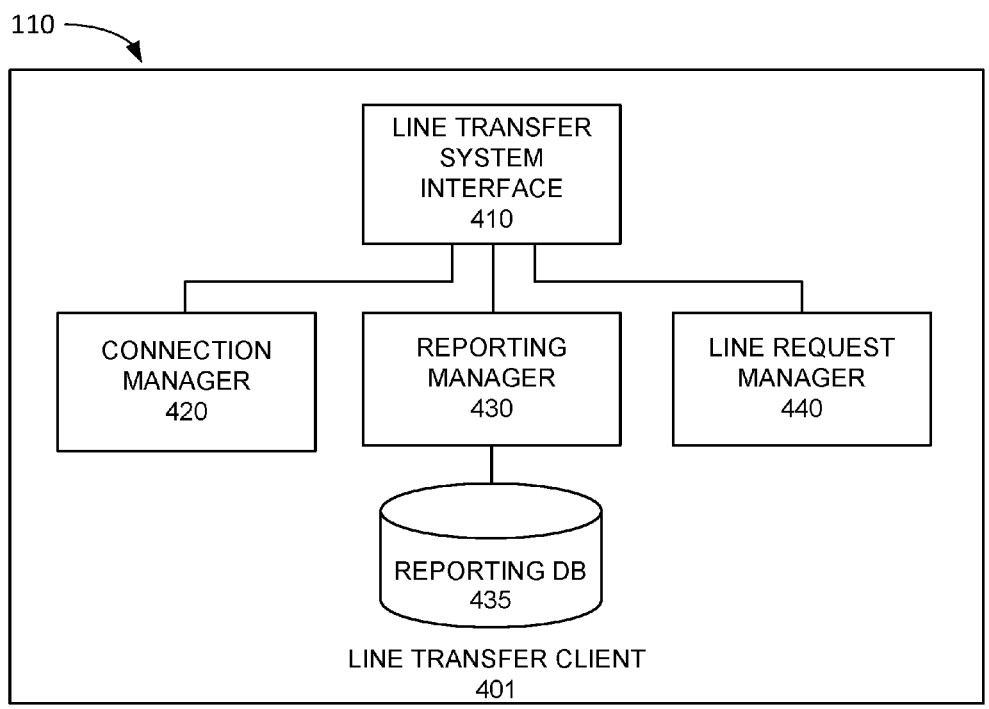
FIG. 4 is a diagram illustrating exemplary functional components of the user equipment (UE) of FIG. 1.

FIG. 4 is a diagram illustrating exemplary functional components of UE device 110 according to an implementation described herein. The functional components of UE device 110 may be implemented, for example, via processing unit 310 executing instructions from memory 320. Alternatively, some or all of the functional components of UE device 110 may be implemented via hard-wired circuitry. As shown in FIG. 4, UE device 110 may include a line transfer client 401. Line transfer client 401 may manage subscription line transfers and/or information that may be used by line transfer system 160 to determine whether a subscription line should be transferred. As shown in FIG. 4, line transfer client 401 may include a line transfer system interface 410, a connection manager 420, a reporting manager 430, a reporting database (DB) 435, and a line request manager 440.

Line transfer system interface 410 may be configured to communicate with line transfer system 160. Connection manager 420 may attach to access network 130 or detach from access network 130 based on instructions received from access network 130 and/or from line transfer system 160. For example, connection manager 420 may receive a PCO message (and/or another type of message) from MME 230 (or from PGW 250) via eNodeB 210, instructing connection manager 420 to attach to access network 130, or to detach from access network 130, and may carry out the instructions included in the PCO message.

Reporting manager 430 may send status updates to line transfer system 160 at particular intervals, or in response to particular events, based on information stored in reporting DB 435. Reporting DB 435 may store information relating to UE device 110 that may be sent to line transfer system 160 in a status update message. For example, reporting DB 435 may store the location of UE device 110, the distance between UE device 110 and a particular location (e.g., the user's home, the user's office, etc.), whether UE device 110 is in use or in an idle state, other UE devices 110 that are detected to be in proximity, application running on UE device 110, whether UE device 110 is in motion, a speed of UE device 110, an orientation of UE device 110, a battery charge level for UE device 110, and/or other types of status information for UE device 110.

Line request manager 440 may request a subscription line for UE device 110 in response to a detected event. For example, a particular application or process running on UE device 110 may request to communicate with another device that requires IP connectivity to core network 140. Line request manager 440 may be configured to filter requests based on one or more criteria (e.g., a priority associated with a request) and may grant or deny the requests based on the criteria. If line request manager 440 determines that a request should be granted, line request manager 440 may send a request to line transfer system 160 for a subscription line. Alternatively, line request manager 440 may send a request to line transfer system 160 via another UE device 110.

Although FIG. 4 shows exemplary functional components of UE device 110, in other implementations, UE device 110 may include fewer functional components, different functional components, differently arranged functional components, or additional functional components than depicted in FIG. 4. Additionally or alternatively, one or more functional components of UE device 110 may perform functions described as being performed by one or more other functional components of UE device 110.

Figure 5:
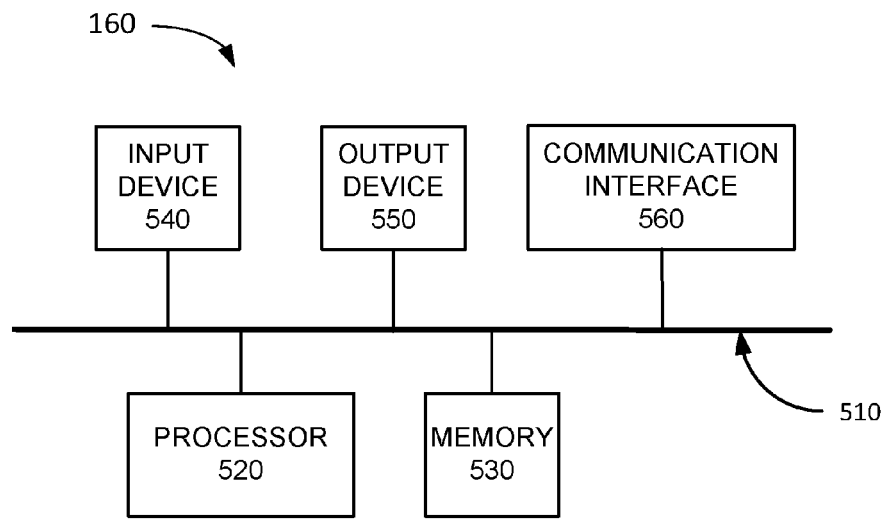
FIG. 5 is a diagram illustrating exemplary components of the line transfer system of FIG. 1.

FIG. 5 is a diagram illustrating exemplary components of line transfer system 160 according to an implementation described herein. As shown in FIG. 5, line transfer system 160 may include a bus 510, a processor 520, a memory 530, an input device 540, an output device 550, and a communication interface 560.

Bus 510 may include a path that permits communication among the components of line transfer system 160. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into line transfer system 160. Input device 540 may include, for example, a keyboard, a mouse, a pen, a microphone, a remote control, an audio capture device, an image and/or video capture device, a touch-screen display, and/or another type of input device. In some embodiments, line transfer system 160 may be managed remotely and may not include input device 540. In other words, line transfer system 160 may be "headless" and may not include a keyboard, for example.

Output device 550 may output information to an operator of line transfer system 160. Output device 550 may include a display, a printer, a speaker, and/or another type of output device. For example, line transfer system 160 may include a display, which may include an LCD for displaying content to the customer. In some embodiments, line transfer system 160 may be managed remotely and may not include output device 550. In other words, line transfer system 160 may be "headless" and may not include a display, for example.

Communication interface 560 may include a transceiver that enables line transfer system 160 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals. Communication interface 560 may be coupled to an antenna for transmitting and receiving RF signals.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communications and/or a wireless network interface (e.g., a WiFi) card for wireless communications. Communication interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, line transfer system 160 may perform certain operations relating to automatic transfer of MDN subscriber lines between devices. Line transfer system 160 may perform these operations in response to processor 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processor 520 to perform processes described herein.

Alternatively, hardwired circuitry may be used in place of, or in combination with, software instructions to implement processes described herein. Thus, implementations described herein are not limited to any specific combination of hardware circuitry and software.

Although FIG. 5 shows exemplary components of line transfer system 160, in other implementations, line transfer system 160 may include fewer components, different components, additional components, or differently arranged components than those depicted in FIG. 5. Additionally or alternatively, one or more components of line transfer system 160 may perform one or more tasks described as being performed by one or more other components of line transfer system 160.

Figure 6:
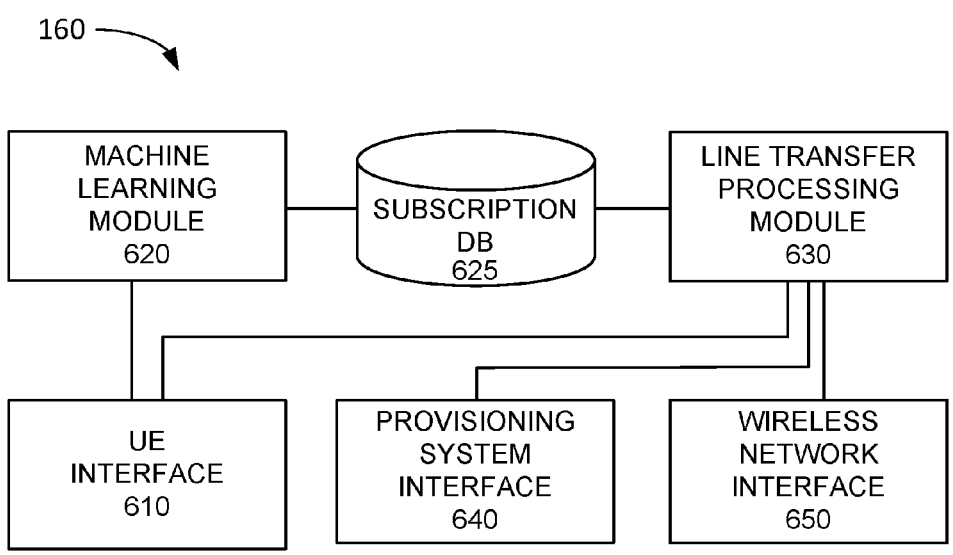
FIG. 6 is a diagram illustrating exemplary functional components of the line transfer system of FIG. 1.

FIG. 6 is a diagram illustrating exemplary functional components of line transfer system 160 according to a first implementation described herein. The functional components of line transfer system 160 may be implemented, for example, via processor 520 executing instructions from memory 530. Alternatively, some or all of the functional components of line transfer system 160 may be implemented via hard-wired circuitry. As shown in FIG. 6, line transfer system 160 may include a UE interface 610, machine learning module 620, a subscription DB 625, a line transfer processing module 630, a provisioning system interface 640, and a wireless network interface 650.

UE interface 610 may communicate with UE devices 110. As an example, UE interface 610 may receive status updates from UE devices 110. As another example, UE interface 610 may receive a subscription line transfer request from UE device 110.

Machine learning module 620 may perform machine learning to identify line transfer triggering conditions for particular UE devices 110 based on status updates received via UE interface 610 and stored in subscription DB 625. Subscription DB 625 may store information for UE devices 110 associated with particular subscriptions. Exemplary information that may be stored in subscription DB 625 is described below with reference to FIG. 7. Line transfer processing module 630 may process subscription line transfers if a learned line transfer triggering condition is detected for a particular UE device 110 and/or if a request to perform a line transfer is received from a particular UE device 110.

Provisioning system interface 640 may communicate with provisioning system 150 to validate line transfers from a first UE device 110 to a second UE device 110 for particular subscriptions. Wireless network interface 650 may be configured to communicate with access network 130 to execute a subscription line transfer. For example, wireless network interface 650 may send instructions to HSS 260 to change an active UE device 110 for a particular subscription.

Although FIG. 6 shows exemplary functional components of line transfer system 160, in other implementations, line transfer system 160 may include fewer functional components, different functional components, differently arranged functional components, or additional functional components than depicted in FIG. 6. Additionally, or alternatively, one or more functional components of line transfer system 160 may perform functions described as being performed by one or more other functional components of line transfer system 160.

Figure 7:
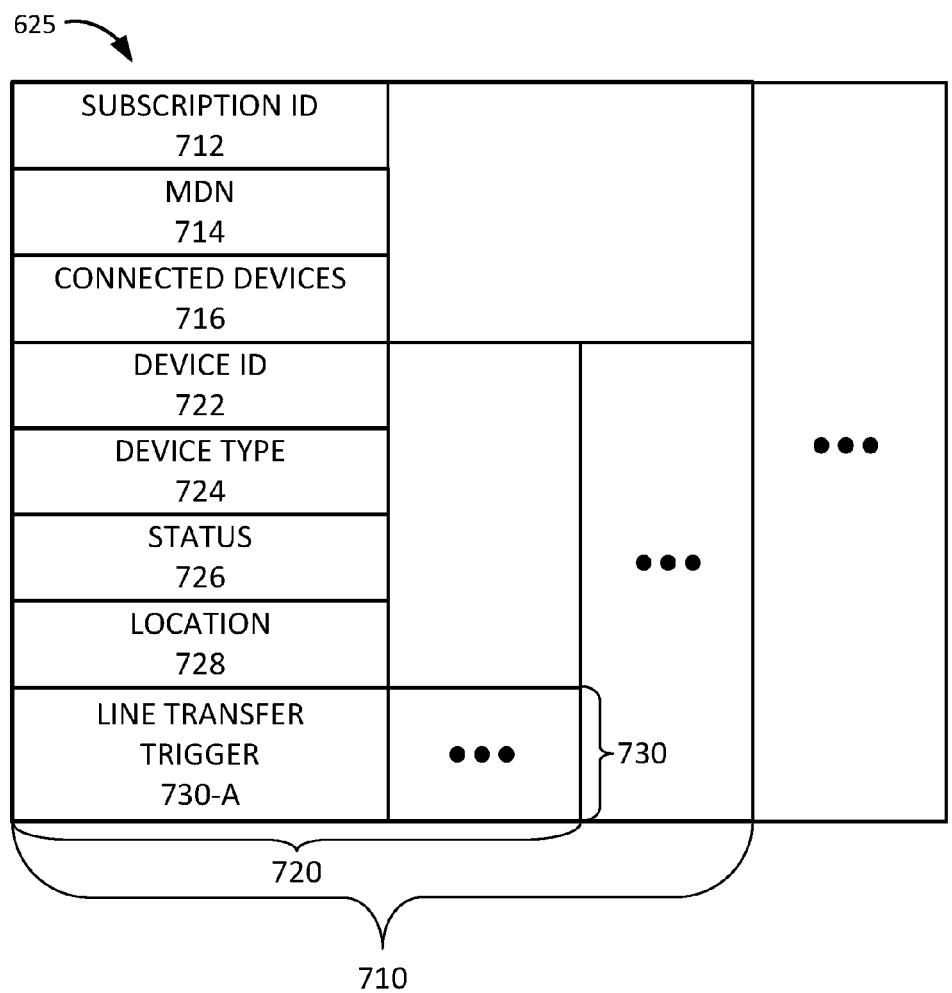
FIG. 7 is a diagram illustrating exemplary components of the subscription database (DB) of FIG. 6.

FIG. 7 is a diagram illustrating exemplary components of subscription DB 625. As shown in FIG. 7, subscription DB 625 may include one or more subscription records 710. Each subscription record 710 may store information relating a particular MDN subscription. Subscription record 710 may include a subscription identifier (ID) field 712, an MDN field 714, a connected devices field 716, and one or more device fields 720.

Subscription ID field 712 may store information identifying a particular subscription. For example, subscription ID field 712 may store an account number associated with the particular subscription. Furthermore, subscription ID field 712 may include information identifying one or more users associated with the subscription, information identifying privileges associated with the subscription (e.g., how many devices can be connected at a time, etc.), and/or other types of subscription information. MDN field 714 may store an MDN assigned to the particular subscription (e.g., MDN, IMSI, MSISDN, etc.). Connected devices field 716 may identify one or more devices, of the devices identified in device fields 720, that are currently connected (e.g., via access network 130) using the particular subscription.

Each device field 720 may store information for a particular UE device 110 that a user, associated with the subscription, has registered for the subscription. Additionally or alternatively, line transfer system 160 may identify a UE device 110 and register the identified UE device 110 with the subscription without explicit actions by a user. For example, a registered UE device 110 may be in proximity and/or in communication with another device and may provide information relating to the other device to line transfer system 160.

Device field 720 may include a device ID field 722, a device type field 724, a status field 726, a location field 728, and one or more line transfer trigger fields 730. Device ID field 722 may include one or more identifiers associated with the particular UE device 110. For example, device ID field 722 may include an International Mobile Equipment Identifier (IMEI), an Integrated Circuit Card Identifier (ICCI), an Internet Protocol (IP) address, a Media Access Control (MAC) address, and/or another type of device identifier.

Device type field 724 may store information identifying a device type associated with the particular UE device 110. For example, the device type may be identified as a smart phone device, a tablet computer device, a wristwatch computer device, a headset computer device, a portable gaming system device, a home appliance device, etc. Additionally or alternatively, device type field 724 may identify a make and model for the particular UE device 110. Status field 726 may store information identifying a status of the particular UE device 110. For example, status field 726 may indicate that UE device 110 is idle, that UE device 110 is active, that UE device 110 is running a particular application, that UE device 110 is in motion, that UE device 110 is in proximity to another device (e.g., communicating with the other device using short range wireless signals), that UE device 110 is being charged, that UE device 110 is at particular battery charge level, that UE device 110 is in a particular orientation, and/or other types of status information. Location field 728 may store information identifying a current, or a last known, location for the particular UE device 110.

Line transfer trigger field 730 (e.g., line transfer trigger field 730-A) may identify a particular line transfer trigger for the particular UE device 110. For example, line transfer trigger field 730 may include information identifying one or more conditions and an action to be performed when the one or more conditions are satisfied. The action may indicate that a subscription line should be transferred to the particular UE device 110 when the conditions are satisfied or that a subscription line should be transferred away from the particular UE device 110 when the conditions are satisfied. The conditions may specify a particular time of day, a particular day of week, a particular location, and/or a particular status associated with the particular UE 110.

Although FIG. 7 shows exemplary fields stored in subscription DB 625, in other implementations, subscription DB 625 may include fewer fields, different fields, differently arranged fields, or additional fields than depicted in FIG. 7.

Figure 8:
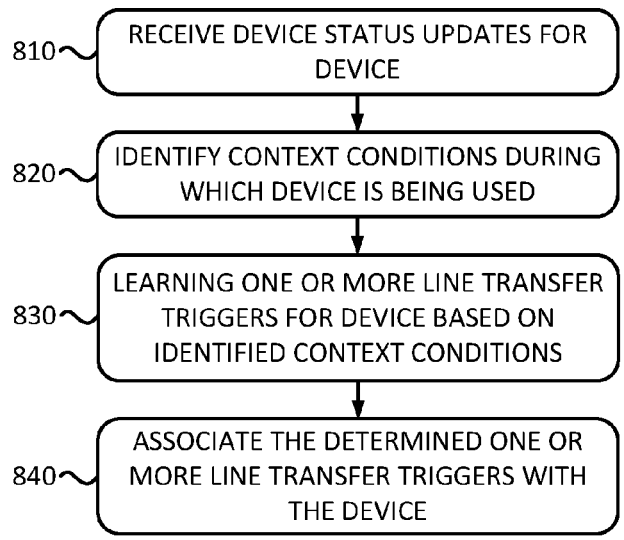
FIG. 8 is a flowchart of a process for configuring a contextual line transfer according to an implementation described herein.

FIG. 8 is a flowchart of a process for configuring a contextual line transfer according to an implementation described herein. In some implementations, the process of FIG. 8 may be performed by line transfer system 160. In other implementations, some or all of the process of FIG. 8 may be performed by another device or a group of devices separate from line transfer system 160.

The process of FIG. 8 may include receiving device status updates for a device (block 810). For example, UE device 110 may send a status update message to line transfer system 160 at particular intervals or in response to particular events. The particular events may include UE device 110 detecting being activated, UE device 110 detecting being connected to access network 130 using the subscriber line, UE device 110 being in a particular location, UE device 110 being in proximity to another device (e.g., another UE device 110), UE device 110 being in motion, the user of UE device 110 selecting to send a status update to line transfer system 160, and/or another type of event.

Context conditions during which the device is being used may be identified (block 820), one or more line transfer triggers for the device may be "learned" based on the identified context conditions (block 830), and the determined one or more line transfer triggers may be associated with the device (840). For example, line transfer system 160 may use machine learning to determine one or more line transfer triggers for UE device 110 based on the status updates received from UE device 110. Line transfer system 160 may identify the context conditions from the received status updates and determine whether the context conditions are associated with UE device 110 using the subscriber line. If UE device 110 is using or requesting the subscriber line in connection with identified context conditions, or if the user indicates that use of the subscriber line is desired, line transfer system 160 may generate a line transfer trigger based on the identified context conditions and may generate a line transfer trigger field 730 for the device field 720 of subscription record 710 associated with UE device 110.

The context conditions specified in a status update, and/or otherwise determined by line transfer system 160 in connection with receiving a status update, may include a particular time of day, a particular day of week, a particular location, a particular distance from a particular location (e.g., more than one mile from the user's home, etc.), a detected proximity to a particular device, a particular type of user device, whether UE device 110 is in motion, a particular speed and/or particular type of motion associated with UE device 110, a particular orientation of UE device 110, a particular type of calendar event, a particular type of scheduled broadcast (e.g., a live sporting event, a particular television show, etc.), a particular type of received message, and/or another type of condition.

As an example, a line transfer trigger may be set to activate if UE device 110 is determined to be in motion during a particular time of day. As another example, a line transfer trigger may be set to activate if UE device 110 is a particular distance from the user's home. As yet another example, a line transfer trigger may be set to activate if a sporting broadcast is scheduled for a sports team that the user follows (e.g., based on the user's viewing history) and if UE device 110 is in a location away from the user's home.

As yet another example, a line transfer trigger may be set to activate if a browser application is launched on UE device 110 (e.g., a tablet device) and UE device 110 is connected via Bluetooth® to another UE device 110 (e.g., smart phone) that is connected to access network 130 via the subscriber line.

Figure 9:
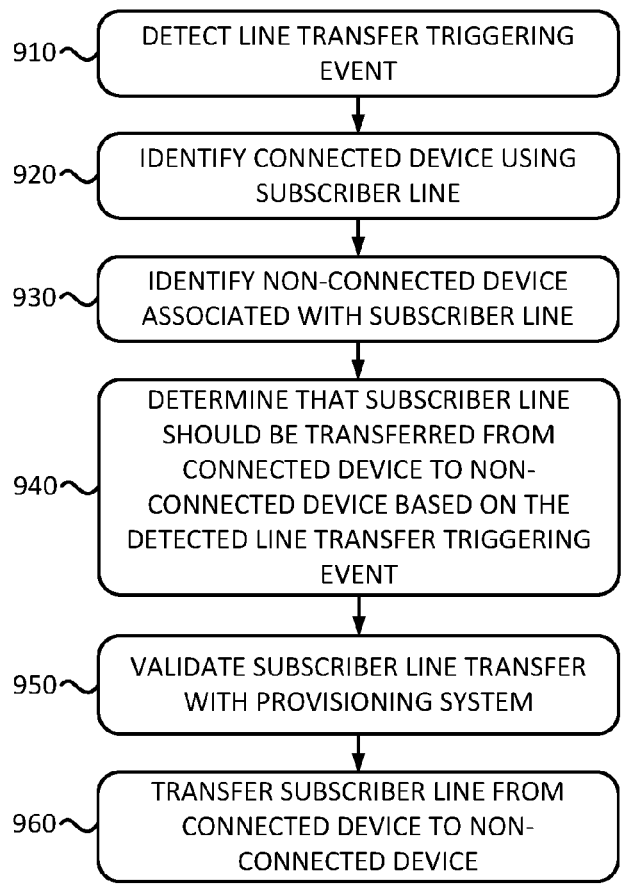
FIG. 9 is a flowchart of a process for performing a contextual line transfer according to an implementation described herein.

FIG. 9 is a flowchart of a process for performing a contextual line transfer according to an implementation described herein. In some implementations, the process of FIG. 9 may be performed by line transfer system 160. In other implementations, some or all of the process of FIG. 9 may be performed by another device or a group of devices separate from line transfer system 160.

The process of FIG. 9 may include detecting a line transfer triggering event (block 910), identifying a connected device using a subscriber line (block 920), identifying a non-connected device associated with the subscriber line (block 930), and determining that the subscriber line should be transferred from the connected device to the non-connected device based on the detected line transfer triggering event (block 940). For example, line transfer system 160 may determine the connected device based on information stored in connected devices field 716 of subscriber record 710 and may monitor the status of non-connected UE devices 110 associated with a subscriber line based on device fields 720 of subscriber record 710 for the subscriber line. Line transfer system 160 may determine that the status of a non-connected UE device 110 has changed and that the change results in conditions, along with associated parameters (e.g., a current time, day of the week, etc.), that match a line transfer trigger associated with the non-connected UE device 110 based on information stored in line transfer trigger field 730 associated with the non-connected UE device 110.

The status of a non-connected UE device 110 may be determined based on a status update received from the non-connected UE device 110. For example, even though a non-connected UE device 110 may not be fully attached to access network 130, the non-connected UE device 110 may be able to send status updates at periodic intervals, or in response to particular events, to base station 135 and base station 135 may forward the status updates to line transfer system 160. The status of a non-connected UE device 110 may also be determined based on a status update received from a connected UE device 110. For example, if a non-connected UE device 110 is in the proximity of the connected UE device 110, the non-connected UE device 110 may send a status update to the connected UE device 110 (e.g., via WiFi wireless signals, via Bluetooth® wireless signals, etc.) and the connected UE device 110 may forward the status update to line transfer system 160 via base station 135.

In some implementations, the status of a non-connected UE device 110 may not be needed to activate a line transfer trigger. As an example, a line transfer trigger may indicate to transfer the subscriber to a non-connected UE device 110 at 8 AM each day and to transfer the line back at 9 AM. Furthermore, a line transfer trigger may indicate that the line should be automatically transferred to a non-connected UE device 110 based on a status of a connected UE device 110. As an example, if the connected UE device 110 is identified as being in a particular location, the line transfer trigger may indicate to automatically transfer the subscriber line to the non-connected UE device 110. As another example, if the connected UE device 110 is identified as having a battery charge level below a threshold, the line transfer trigger may indicate to automatically transfer the subscriber line to the non-connected UE device 110.

Moreover, a line transfer triggering event may be based on receiving a request from a first UE device 110 to transfer the subscriber line to a second UE device 110. The request may be received from the connected UE device 110 as a line push request, or may be received from the non-connected device UE device 110 as a line pull request.

The subscriber line transfer may be validated with a provisioning system (block 950) and the subscriber line may be transferred from the connected device to the non-connected device (block 960). Prior to performing a subscriber line transfer, line transfer system 160 may validate the line transfer with provisioning system 150. For example, line transfer system 160 may send a request to provisioning system 150, identifying the subscription and the proposed line transfer from the connected UE device 110 to the non-connected UE device 110 to determine whether the subscription includes privileges to transfer the subscriber line to the non-connected UE device 110.

If the line transfer is validated by provisioning system 150, line transfer system 160 may perform the line transfer. Line transfer system 160 may instruct access network 130 to transfer the subscriber line from the connected UE device 110 to the non-connected UE device 110. In some implementations, line transfer system 160 may send an instruction to HSS 260. HSS 260 may change an indication in a subscriber DB of the active device associated with the subscription. Additionally or alternatively, HSS 260 and/or line transfer system 160 may send an instruction to IMS network 280 to transfer the IMS core identity for the subscription from the connected UE device 110 to the non-connected UE device 110.

Furthermore, the connected UE device 110 may need to be instructed to detach from access network 130 and the non-connected UE device 110 may need to be instructed to attach to access network 130. In some implementations, the connected UE device 110 and the non-connected UE device 110 may be instructed to detach and attach, respectively, via a PCO message by access network 130. For example, HSS 260 may inform MME 230 (or PGW 250) of the line transfer and MME 230 (or PGW 250) may send a first PCO message to the connected UE device 110 to detach from access network 130 and a second PCO message to the non-connected UE device 110 to attach to access network 130. The PCO message may include a container field dedicated to line transfer instructions (e.g., to attach or detach) and UE device 110 may be configured to retrieve the instructions from the container field of a received PCO message.

In other implementations, the connected UE device 110 and the non-connected UE device 110 may be instructed to detach and attach, respectively, via messages sent by line transfer system 160. As an example, line transfer system 160 may send a Short Message Format (SMS) message to the connected UE device 110 and the non-connected UE device 110 with a line transfer instruction identifier and line transfer client 401 may configured to recognize the line transfer instruction identifier and to retrieve the line transfer instructions from a received SMS message. As another example, line transfer system 160 may send a message using a dedicated communication protocol and an Application Programming Interface (API) associated with line transfer client 401. As yet another example, line transfer system 160 may send a message using a protocol associated with Over-The-Air (OTA) activation of SIM cards to UE devices 110.

Figure 10:
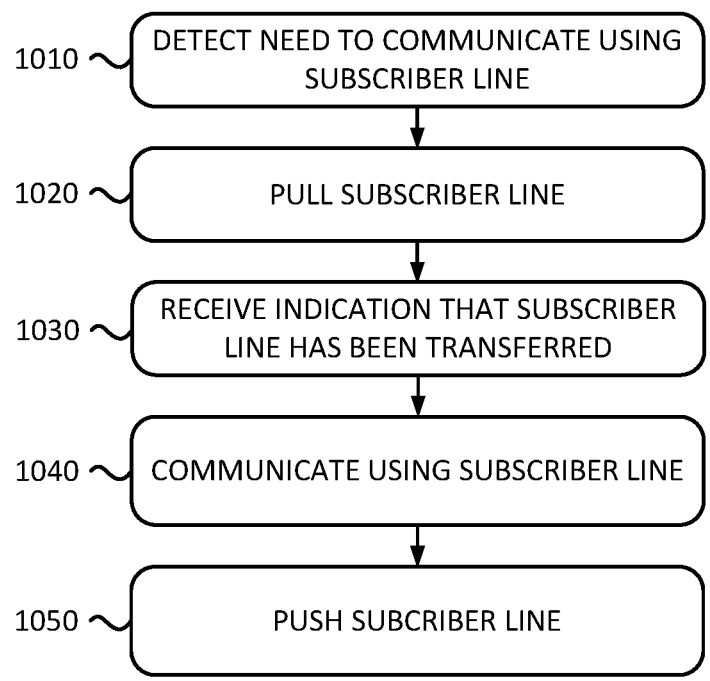
FIG. 10 is a flowchart of a process for requesting a line transfer according to an implementation described herein.

FIG. 10 is a flowchart of a process for requesting a line transfer according to an implementation described herein. In some implementations, the process of FIG. 10 may be performed by UE device 110. In other implementations, some or all of the process of FIG. 10 may be performed by another device or a group of devices separate from UE device 110.

The process of FIG. 10 may include detecting a need to communicate using a subscriber line (block 1010) and the subscriber line may be pulled (block 1020). For example, a non-connected first UE device 110 may detect a request by an application or a process to send a message to a server device via core network 140 or may detect a request for information from the application or process from the server device. The request may be sent automatically without requiring user input. In some implementations, the request may be sent by the non-connected first UE device 110 to line transfer system 160. In other implementations, the request may be sent by the non-connected first UE device 110 to a connected second UE device 110 and the connected second UE device 110 may forward the request to line transfer system 160. In response, line transfer system 160 may transfer the subscriber line to the requesting device.

An indication may be received that the subscriber line has been transferred (block 1030) and communication using the subscriber line may be performed (block 1040). As an example, first UE device 110 may receive a PCO message from MME 230 (or PGW 250) instructing the first UE device to attach to access network 130. As another example, first UE device 110 may receive a message from line transfer system 160 informing the first UE device 110 that first UE device 110 should attach to access network 130. The first UE device 110 may attach to access network 130. Access network 130 may establish IP connectivity with core network 140 (and/or with IMS network 280). The first UE device 110 may then perform the requested communication with the server device.

The subscriber line may be pushed (block 1050). For example, after the first UE device 110 is finished using the subscriber line, the first UE device 110 that has requested and used the subscriber line may send a request to line transfer system 160 to push the line back to the second UE device 110 from which the line has been pulled. Line transfer system 160 may then transfer the subscriber line back to the second UE device 110.

Figure 11:
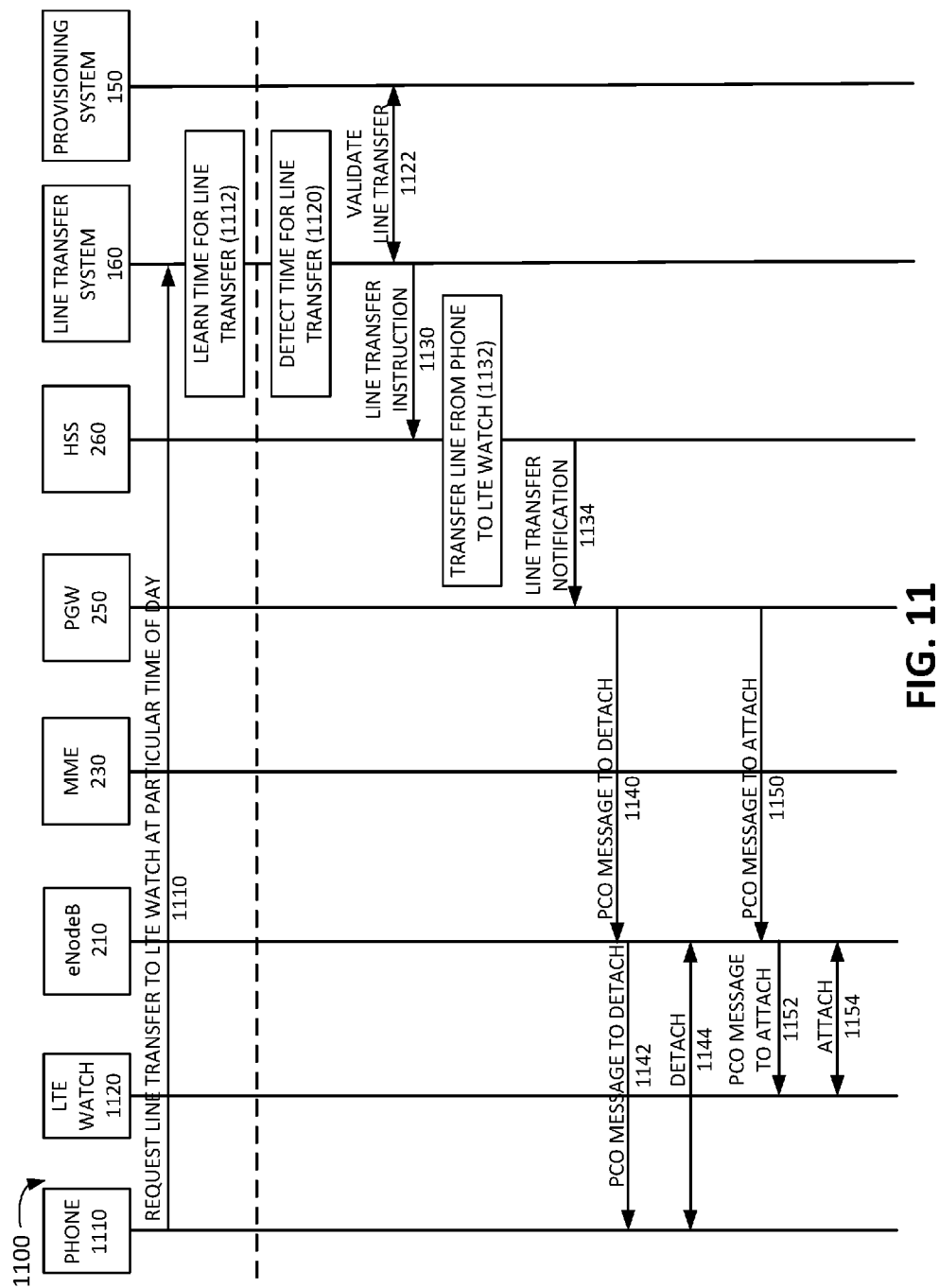
FIG. 11 is an exemplary diagram of a first signal flow according to an implementation described herein.

FIG. 11 is an exemplary diagram of a first signal flow 1100 according to an implementation described herein. Assume that a user goes jogging each morning around 8 AM and uses an LTE watch to record the details of the run and upload the data from the LTE watch to a server device. Furthermore, the user may use the LTE watch to stream music while jogging. As shown in FIG. 11, signal flow 1100 may include a user requesting to transfer a subscription line from phone 1110 to LTE watch 1120 at a particular time by sending a line transfer request to line transfer system 160 (signal 1112). For example, the user may log into a web portal associated with line transfer system 160 and manually request transfer of the subscription line from phone 1110 to LTE watch 1120. The user may repeat this process every day for a few days within a particular time period (e.g., around 8 AM each day).

In response, line transfer system 160 may learn or identify the time at which the transfer is requested and may automate the transfer by setting a line transfer trigger condition for 8 AM (block 1114). Additionally, line transfer system 160 may determine that LTE watch 1120 is in motion right after the user requests to transfer and may add an additional line transfer trigger condition to wait to transfer the subscription line until LTE watch 1120 is in motion. The additional condition may ensure that the subscription line is not needlessly transferred on days that the user does not go jogging. Furthermore, the user may be informed that the line transfer has been automated based on the user's routine. Alternatively, the user may be prompted for permission to automate the line transfer.

Once the line transfer triggering condition is learned, line transfer system 160 may detect the time for the triggering condition and may detect that LTE watch 1120 is in motion (block 1116). In response, line transfer system 160 may validate the transfer with provisioning system 150 to ensure the subscription allows the user to switch the subscription line to LTE watch 1120 (signal 1122). After validation, line transfer system 160 may send an instruction to HSS 260 to change the active device for the subscription from phone 1110 to LTE watch 1120 (signal 1130). HSS 260 may change the active device for the subscription to LTE watch 1120 (block 1132) and may send a line transfer notification to PGW 250 (signal 1134). The line transfer notification may include an indication of the transfer from phone 1110 to LTE watch 1120 and may include an IMS core identity for the subscription.

In response, PGW 250 may generate a PCO message instructing phone 1110 to detach from access network 130 (signal 1140) to eNodeB 210 and eNodeB 210 may forward the PCO message to phone 1110 (signal 1142). In response, phone 1110 may detach from access network 130 via communication with eNodeB 210 (signal 1144). Furthermore, PGW 250 may generate a PCO message instructing LTE watch 1120 to attach to access network 130 (signal 1150) to eNodeB 210 and eNodeB 210 may forward the PCO message to LTE watch 1120 (signal 1152). The PCO message may include information identifying an IMS core identity that may enable LTE watch 1120 to connect to IMS network 280. In response, LTE watch 1120 may attach to access network 130 via communication with eNodeB 210 (signal 1154). In other implementations, HSS 260 may send the line transfer notification to MME 230 and MME 230 may send the PCO messages to phone 1110 and LTE watch 1120.

FIG. 12 is an exemplary diagram of a second signal flow according to an implementation described herein. Assume that a user goes skiing and arrives at a ski resort with phone 1210 and a headset camera 1220. The user may plan to wear headset camera 1220 while skiing and to upload pictures or videos while skiing. Phone 1210 may report the user's location to line transfer system 160 along with an indication that headset camera 1220 is in proximity to phone 1210 based on short range wireless signals emitted by headset camera 1220 (signal 1222). Line transfer system 160 may include a database of location and associated contexts. For example, subscription DB 625 may associate ski resorts with headset cameras. Line transfer system 160 may recognize the reported location as a ski resort, may recognize headset camera 1220 as a headset device, and may determine that the subscription line should be transferred from phone 1210 to headset camera 1220 once the user starts skiing (e.g., while headset camera 1220 is in motion) based on information stored in line transfer trigger field 730 (block 1224).

In response, line transfer system 160 may validate the transfer with provisioning system 150 to ensure the subscription allows the user to switch the subscription line to headset camera 1220 (signal 1226). After validation, line transfer system 160 may send an instruction to HSS 260 to change the active device for the subscription from phone 1210 to headset camera 1220 (signal 1230). HSS 260 may change the active device for the subscription to headset camera 1220 (block 1232) and may send a line transfer notification to PGW 250 (signal 1234). The line transfer notification may include an indication of the transfer from phone 1210 to headset camera 1220 and may include an IMS core identity for the subscription.

In response, PGW 250 may generate a PCO message instructing phone 1210 to detach from access network 130 (signal 1240) to eNodeB 210 and eNodeB 210 may forward the PCO message to phone 1210 (signal 1242). In response, phone 1210 may detach from access network 130 via communication with eNodeB 210 (signal 1244). Furthermore, PGW 250 may generate a PCO message instructing headset camera 1220 to attach to access network 130 (signal 1250) to eNodeB 210 and eNodeB 210 may forward the PCO message to headset camera 1220 (signal 1252). The PCO message may include information identifying an IMS core identity that may enable headset camera 1220 to connect to IMS network 280. In response, headset camera 1220 may attach to access network 130 via communication with eNodeB 210 (signal 1254). In other implementations, HSS 260 may send the line transfer notification to MME 230 and MME 230 may send the PCO messages to phone 1110 and headset camera 1220.

The subscription line may be automatically transferred back to phone 1210 whenever the user picks up and starts to use phone 1210. For example, when the user activates the touchscreen of phone 1210, phone 1210 may send a status update to line transfer system 160 and line transfer system 160 may activate a line transfer trigger condition for phone 1210 which indicates that whenever the touchscreen of phone 1210 is activated, the subscription line should be automatically transferred back to phone 1210.

Figure 13A:
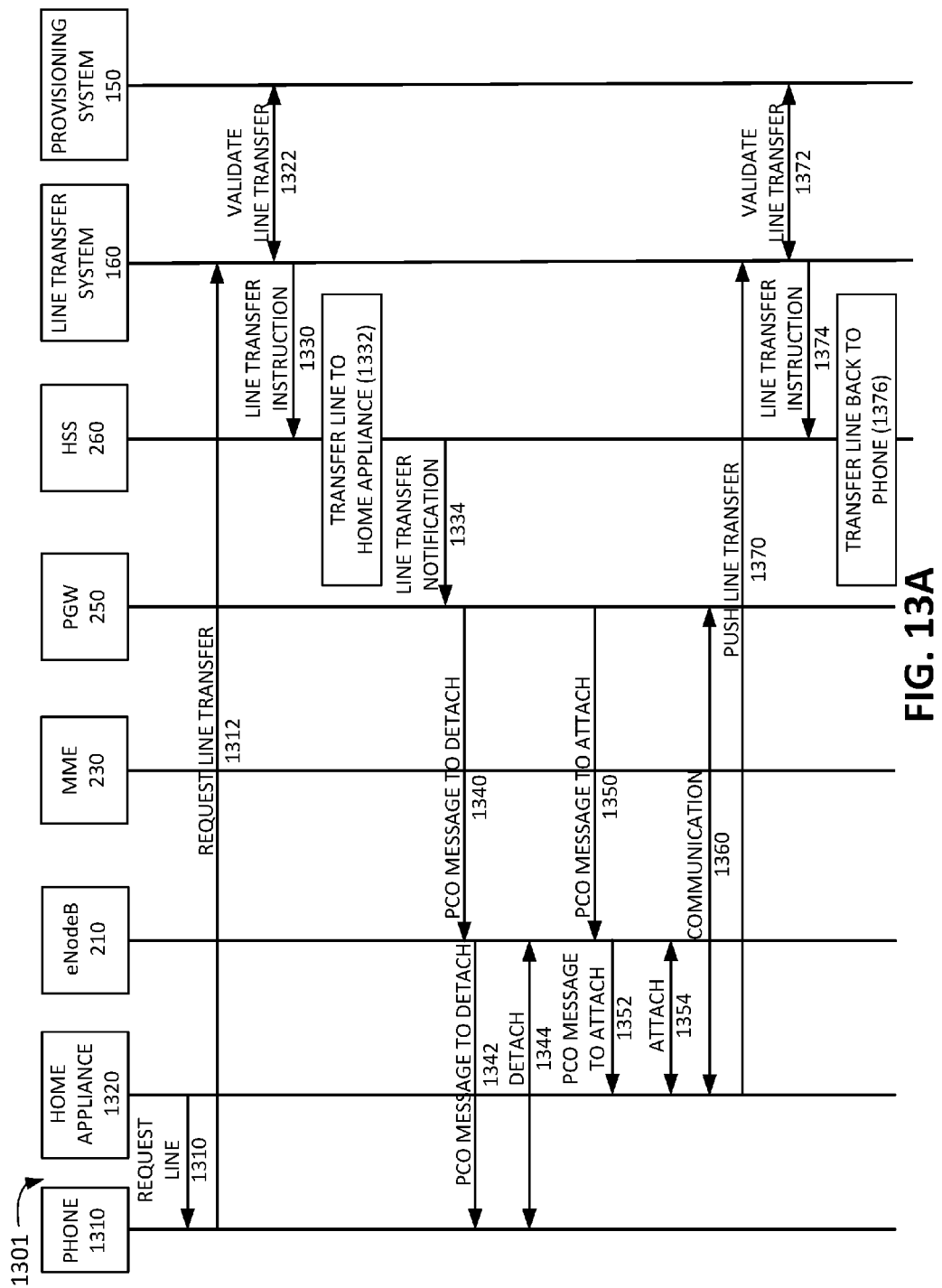
FIGS. 13A and 13B are exemplary diagrams of a third signal flow according to an implementation described herein.
Figure 13B:
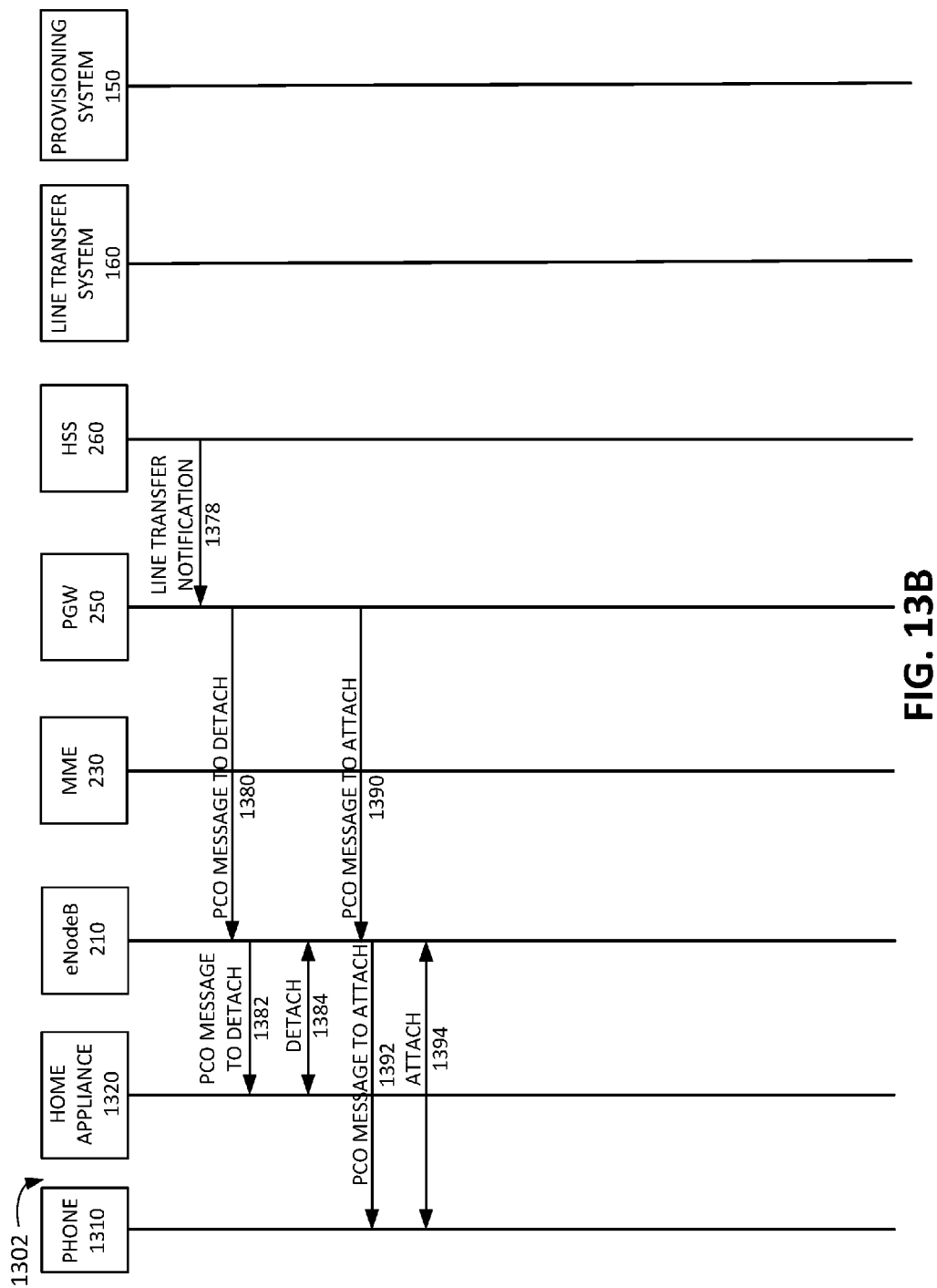

FIGS. 13A and 13B are exemplary diagrams of third signal flows 1301 and 1302 according to an implementation described herein. Assume that a home appliance 1320 is enabled for LTE communication and needs to communicate with another device across a network. For example, a refrigerator may need to report a compressor malfunction. As another example, a coffee maker may be out of coffee and may need to order additional coffee from a web site. Home appliance 1320 may be send a line request to phone 1310 (signal 1312) when phone 1310 is not in use. In response, phone 1310 may forward the request to line transfer system 1314).

In response, line transfer system 160 may validate the transfer with provisioning system 150 to ensure the subscription allows the user to switch the subscription line to home appliance 1320 (signal 1322). After validation, line transfer system 160 may send an instruction to HSS 260 to change the active device for the subscription from phone 1310 to home appliance 1320 (signal 1330). HSS 260 may change the active device for the subscription to home appliance 1320 (block 1332) and may send a line transfer notification to PGW 250 (signal 1334). The line transfer notification may include an indication of the transfer from phone 1310 to home appliance 1320 and may include an IMS core identity for the subscription.

In response, PGW 250 may generate a PCO message instructing phone 1310 to detach from access network 130 (signal 1340) to eNodeB 210 and eNodeB 210 may forward the PCO message to phone 1310 (signal 1342). In response, phone 1310 may detach from access network 130 via communication with eNodeB 210 (signal 1344). Furthermore, PGW 250 may generate a PCO message instructing home appliance 1320 to attach to access network 130 (signal 1350) to eNodeB 210 and eNodeB 210 may forward the PCO message to home appliance 1320 (signal 1352). The PCO message may include information identifying an IMS core identity that may enable home appliance 1320 to connect to IMS network 280. In response, home appliance 1320 may attach to access network 130 via communication with eNodeB 210 (signal 1354). In other implementations, HSS 260 may send the line transfer notification to MME 230 and MME 230 may send the PCO messages to phone 1110 and headset camera 1220.

Home appliance 1320 may perform the required communication by connecting to core network 140 via PGW 250 (signal 1360). After home appliance 1320 is finished using the subscription line (e.g., no additional messages from/to home appliance 1320 need to be sent or received), home appliance 1320 may push the subscription line back to phone 1310 by sending a line transfer request to line transfer system 160 (signal 1370). In response, line transfer system 160 may validate the transfer with provisioning system 150 to ensure the subscription allows the user to switch the subscription line back to phone 1310 (signal 1372). After validation, line transfer system 160 may send an instruction to HSS 260 to change the active device for the subscription from home appliance 1320 to phone 1310 (signal 1374). HSS 260 may change the active device for the subscription to phone 1310 (block 1376). Continuing on FIG. 13B, HSS 260 may send a line transfer notification to PGW 250 (signal 1378). The line transfer notification may include an indication of the transfer from home appliance 1320 to phone 1310 and may include an IMS core identity for the subscription.

In response, PGW 250 may generate a PCO message instructing home appliance 1320 to detach from access network 130 (signal 1380) to eNodeB 210 and eNodeB 210 may forward the PCO message to home appliance 1320 (signal 1382). In response, home appliance 1320 may detach from access network 130 via communication with eNodeB 210 (signal 1384). Furthermore, PGW 250 may generate a PCO message instructing phone 1310 to attach to access network 130 (signal 1390) to eNodeB 210 and eNodeB 210 may forward the PCO message to phone 1310 (signal 1392). The PCO message may include information identifying an IMS core identity that may enable phone 1310 to connect to IMS network 280. In response, phone 1310 may attach to access network 130 via communication with eNodeB 210 (signal 1394).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 8, 9, and 10, and series of signal flows have been described with respect to FIGS. 11, 12, 13A, and 13B, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:

determining, by the computer device, that a context condition is associated with a plurality of requests made by a user over a time period to transfer a mobile directory number (MDN) subscriber line from a first user device associated with the MDN subscriber line to a second user device associated with the MDN subscriber line;

learning, over the time period and by the computer device, the context condition as an MDN subscriber line transfer triggering event based on determining that the context condition is associated with the plurality of requests;

detecting, by the computer device, the MDN subscriber line transfer triggering event;

identifying, by the computer device, the first user device associated with the MDN subscriber line, wherein the first user device corresponds to a connected device with respect to the MDN subscriber line;

identifying, by the computer device, the second user device associated with the MDN subscriber line, wherein the second user device corresponds to a non-connected device with respect to the MDN subscriber line;

determining, by the computer device, that the MDN subscriber line is to be transferred from the first user device to the second user device based on the detected MDN subscriber line transfer triggering event; and automatically transferring, by the computer device, the MDN subscriber line from the first user device to the second user device, in response to determining that the MDN subscriber line is to be transferred from the first user device to the second user device, wherein transferring the MDN subscriber line from the first user device to the second user device includes:

sending an instruction to a Home Subscriber Server to change an indication of an active device associated with the MDN subscriber line from the first user device to the second user device.

2. The method of claim 1, further comprising:
receiving a status update for the second user device; and
identifying the context condition during which the second user device is using the MDN subscriber line based on the received status update.

3. The method of claim 1, wherein the context condition includes one or more conditions associated with a routine of the user, and wherein detecting the MDN subscriber line transfer triggering event includes:
detecting the one or more conditions associated with the routine of the user.

4. The method of claim 3, wherein the one or more conditions include at least one of a particular time of day, a particular day of week, a particular location, a particular type of calendar event, a particular type of scheduled broadcast, or a particular type of received message.

5. The method of claim 1, wherein the context condition includes the second user device being located in a particular location, and wherein detecting the MDN subscriber line transfer triggering event includes:
detecting that the second user device is in the particular location.

6. The method of claim 1, wherein the context condition includes the second user device being within a particular range of a particular device, and wherein detecting the MDN subscriber line transfer triggering event includes:
detecting that the second user device is within the particular range of the particular device.

7. The method of claim 1, further comprising:
detecting another MDN subscriber line transfer triggering event based on receiving a request to transfer the MDN subscriber line to the second user device.

8. The method of claim 7, wherein receiving the request to transfer the MDN subscriber line to the second user device includes:
receiving a push request from the first user device to provide the MDN subscriber line to the second user device.

9. The method of claim 7, wherein receiving the request to transfer the MDN subscriber line to the second user device includes:

receiving a pull request from the second user device to provide the MDN subscriber line to the second user device.

10. The method of claim 7, further comprising:
receiving an indication from the second user device that the second user device has finished using the MDN subscriber line; and
transferring the MDN subscriber line from the second user device back to the first user device, in response to receiving the indication from the second user device that the second user device has finished using the MDN subscriber line.

11. The method of claim 1, further comprising:
validating, with a provisioning system, that the MDN subscriber line is authorized for a transfer from the first user device to the second user device.

12. A computer device comprising:
a communication interface; and
logic configured to:
determine that a context condition is associated with a plurality of requests made by a user over a time period to transfer a mobile directory number (MDN) subscriber line from a first user device associated with the MDN subscriber line to a second user device associated with the MDN subscriber line;
learn, over the time period, the context condition as an MDN subscriber line transfer triggering event based on determining that the context condition is associated with the plurality of requests;
detect the MDN subscriber line transfer triggering event using the communication interface;
identify the first user device associated with the MDN subscriber line, wherein the first user device corresponds to a connected device with respect to the MDN subscriber line;
identify the second user device associated with the MDN subscriber line, wherein the second user device corresponds to a non-connected device with respect to the MDN subscriber line;
determine that the MDN subscriber line is to be transferred from the first user device to the second user device based on the detected MDN subscriber line transfer triggering event; and
automatically transfer the MDN subscriber line from the first user device to the second user device using the communication interface, in response to determining that the MDN subscriber line is to be transferred from the first user device to the second user device, wherein, when transferring the MDN subscriber line from the first user device to the second user device, the logic is further configured to:
send an instruction to a Home Subscriber Server to change an indication of an active device associated with the MDN subscriber line from the first user device to the second user device.

13. The computer device of claim 12, wherein the logic is further configured to:
receive a status update for the second user device; and
identify the context condition during which the second user device is using the MDN subscriber line based on the received status update.

14. The computer device of claim 12, wherein the context condition includes one or more conditions associated with a routine of the user, and wherein when detecting the MDN subscriber line transfer triggering event, the logic is configured to:

detect the one or more conditions associated with the routine of the user associated with the MDN subscriber line, wherein the one or more conditions include at least one of a particular time of day, a particular day of week, a particular location, a detected proximity to a particular device, a particular type of calendar event, a particular type of scheduled broadcast, or a particular type of received message.

15. The computer device of claim 12, wherein the context condition includes the second user device being located in a particular location, and wherein when detecting the MDN subscriber line transfer triggering event, the logic is configured to:
detect that the second user device is in the particular location.

16. The computer device of claim 12, wherein the context condition includes the second user device being within a particular range of a particular device, and wherein when detecting the MDN subscriber line transfer triggering event, the logic is configured to:
detect that the second user device is within the particular range of the particular device.

17. The computer device of claim 12, wherein the logic is further configured to:
receive a request to transfer the MDN subscriber line to the second user device.

18. The computer device of claim 12, wherein the logic is further configured to:
receive an indication from the second user device that the second user device has finished using the MDN subscriber line; and
transfer the MDN subscriber line from the second user device back to the first user device, in response to receiving the indication from the second user device that the second user device has finished using the MDN subscriber line.

19. A non-transitory memory device storing instructions executable by one or more processors, the non-transitory memory device comprising:

one or more instructions to determine that a context condition is associated with a plurality of requests made by a user over a time period to transfer a subscriber line from a first user device associated with the subscriber line to a second user device associated with the subscriber line;
one or more instructions to learn, over the time period, the context condition as a subscriber line transfer triggering event based on determining that the context condition is associated with the plurality of requests;
one or more instructions to detect the subscriber line transfer triggering event;
one or more instructions to identify the first user device associated with the subscriber line, wherein the first user device corresponds to a connected device with respect to the subscriber line;
one or more instructions to identify the second user device associated with the subscriber line, wherein the second user device corresponds to a non-connected device with respect to the subscriber line;
one or more instructions to determine that the subscriber line is to be transferred from the first user device to the second user device based on the detected subscriber line transfer triggering event; and
one or more instructions to automatically transfer the subscriber line from the first user device to the second user device, in response to determining that the subscriber line is to be transferred from the first user device to the second user device, wherein the one or more instructions to transfer the MDN subscriber line from the first user device to the second user device include:
one or more instructions to send an instruction to a Home Subscriber Server to change an indication of an active device associated with the MDN subscriber line from the first user device to the second user device.

20. The method of claim 3, wherein the one or more conditions include a detected proximity to a particular device.

* * * * *